June 5, 1923.
A. LAZARUS
CHOPPER
Filed Dec. 26, 1922
1,457,374
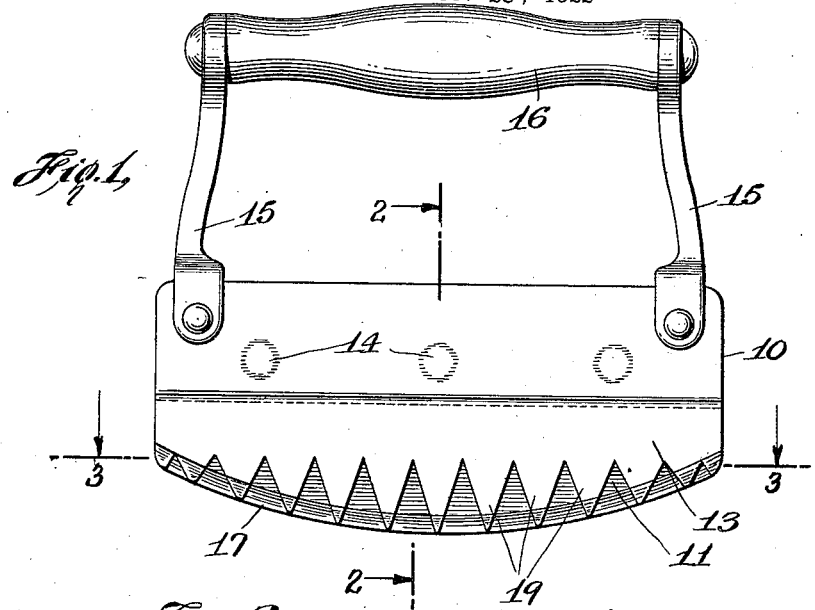
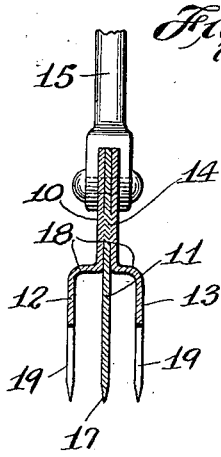
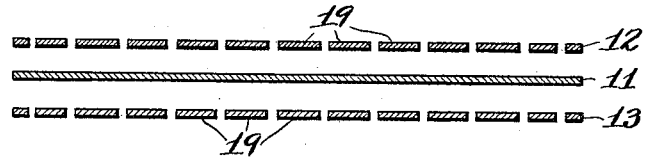
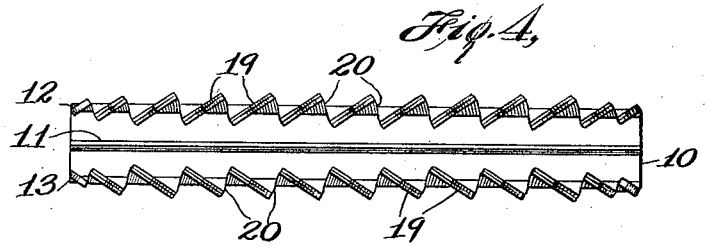
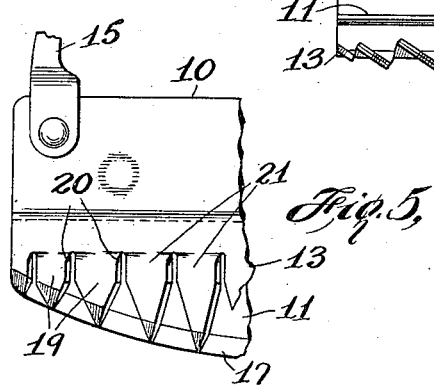
Inventor
Albert Lazarus
By his Attorneys
Edgar Bates &Co Patented June 5, 1923.

1,457,374

UNITED STATES PATENT OFFICE.

ALBERT LAZARUS, OF NEW YORK, N. Y.

CHOPPER.

Application filed December 26, 1922. Serial No. 608,848.

*To all whom it may concern:*

Be it known that I, ALBERT LAZARUS, a citizen of the United States, and residing at Bronx, in the county of Westchester and State of New York, have invented certain new and useful Improvements in Choppers, of which the following is a specification, such as will enable those skilled in the art to which it appertains to make and use the same.

This invention relates to choppers and particularly to what are known as food choppers designed to be used in chopping various kinds and classes of food products; and the object of the invention is to provide a chopper of the class specified which is designed to more efficiently and quickly chop food products of various kinds and classes; a further object being to provide a chopper of this class with a central chopper or cutter blade at the opposite sides of which and spaced from the central blade are other chopper members preferably provided with a multiplicity of spaced blades, said last named chopper members conforming generally with the lower or cutting edge of the central blade; a further object being to provide a tool or utensil of the class described, the chopper members or the separate blades of which may extend in a plane parallel to or at an angle to the longitudinal plane of the central blade; and with these and other objects in view, the invention consists in a device of the class and for the purpose specified, which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a side view of one form of my improved chopper.

Fig. 2 is a partial section on the line 2—2 of Fig. 1.

Fig. 3 is a partial section on the line 3—3 of Fig. 1.

Fig. 4 is a bottom edge view of a chopper showing a modified arrangement of the chopper members which I employ; and, Fig. 5 is a partial side view of the chopper shown in Fig. 4.

In Figs. 1 to 3 inclusive, I have shown a chopper comprising a blade member 10 composed, in the construction shown, of three blade members 11, 12 and 13, the blade member 11 being the central member while the members 12 and 13 are arranged at the opposite sides of the central blade member. The blade members 11, 12 and 13 are preferably composed of sheet metal and are secured together by riveting, welding or the like as indicated at 14 and mounted in connection therewith at the opposite end portions thereof are upwardly directed arms 15, which support therebetween a handle member 16.

The blade member 11 in the construction shown, comprises a flat sheet of metal, the lower edge of which is beveled and preferably arc-shaped in form as shown at 17 to form a cutting edge. The blade members 12 and 13 which are arranged at the opposite sides of the blade member 11 are offset as shown at 18 to space the lower ends of said blade members from the central blade member, and the edges of the blade members 12 and 13 are arc-shaped in general form to conform substantially to the shape of the edge 17 of the blade 11 and the edges of the blade members 12 and 13 are cut out to form a plurality of spaced and substantially V-shaped chopper blades 19 which extend longitudinally of the chopper body 10 and in a plane which is similar to the longitudinal plane of the blade 11, in the construction in Figs. 1 to 3 inclusive.

In Figs. 4 and 5 of the drawing, I have shown the chopper blades 19 set at an angle to the longitudinal plane of the blade member 11 as shown at 20. This result is accomplished by forming a twist in the chopper blades 19 and by constructing the shank of said blades as indicated at 21 in Fig. 5 of the drawing.

It will be understood that with a tool or chopper of the class described, the operation of chopping various kinds of food products will be facilitated and the desired result produced much quicker than with the usual type of chopper, this result being accomplished by reason of the construction of the chopper blades 19 and also by reason of the increased chopping or cutting surface thereof, and while I have shown specific forms of chopper blades 19 and a specific number of and arrangement of the blade members 12 and 13, it will be understood that my invention is not necessarily limited in these respects and various changes in and modifications of the construction herein shown and described may be made within the scope of the appended claims without departing from the spirit of my invention or sacrificing its advantages.

Having fully described my invention, what I claim as new and desire to secure by Letters Patent, is:—

1. A chopper of the class described comprising a chopper body composed of a central blade member having a continuous cutting edge and other blade members mounted at the opposite sides of the central blade member and spaced therefrom, said last named blade members being provided with a plurality of spaced chopper blades.

2. A chopper of the class described comprising a chopper body composed of a central blade member having a continuous cutting edge and other blade members mounted at the opposite sides of the central blade member and spaced therefrom, said last named blade members being provided with a plurality of spaced chopper blades, and a handle member mounted in connection with said chopper body.

3. A device of the class described comprising a chopper body composed of a plurality of blade members, the lower ends of said blade members having cutting edges and the cutting edges of a plurality of said blade members being fashioned to form independent chopper blades and the cutting edge of the other blade member being continuous.

4. A device of the class described comprising a chopper body composed of a plurality of blade members, the lower ends of said blade members having cutting edges and the cutting edges of a plurality of said blade members being fashioned to form independent chopper blades and the cutting edge of the other blade member being continuous, and the cutting edges of said blade members being substantially arc-shaped in form.

5. A chopper of the class described comprising a chopper body composed of three sheet metal blade members, one of said blade members, the central blade member, being straight and provided with a curved cutting edge, and the other of said blade members having curved cutting edges offset at the opposite sides of said first named blade members and being fashioned to form a plurality of independent and spaced cutters.

6. A chopper of the class described comprising a chopper body composed of three sheet metal blade members, one of said blade members, the central blade member, being straight and provided with a curved cutting edge, and the other of said blade members having curved cutting edges offset at the opposite sides of said first named blade members and being fashioned to form a plurality of independent and spaced cutters, the shanks of said blade members being secured together, and a handle member mounted in connection with the shanks of said blade members.

7. A chopper of the class described comprising a chopper body composed of three sheet metal blade members, one of said blade members being straight and having a curved cutting edge and the other of said blade members being mounted at the opposite sides of the first named blade member and the lower portions thereof being offset and provided with substantially curved cutting edges sub-divided by recesses into a plurality of chopper blade members.

In testimony that I claim the foregoing as my invention I have signed my name this 23rd day of Dec., 1922.

ALBERT LAZARUS.